(12) United States Patent
Loehl

(10) Patent No.: US 11,958,008 B2
(45) Date of Patent: Apr. 16, 2024

(54) ROUND FILTER ELEMENT

(71) Applicant: MANN+HUMMEL GmbH, Ludwigsburg (DE)

(72) Inventor: Thomas Loehl, Mundelsheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 589 days.

(21) Appl. No.: 17/172,198

(22) Filed: Feb. 10, 2021

(65) Prior Publication Data

US 2021/0162332 A1 Jun. 3, 2021

Related U.S. Application Data

(63) Continuation of application No. PCT/EP2019/070855, filed on Aug. 2, 2019.

(30) Foreign Application Priority Data

Aug. 14, 2018 (DE) .................... 10 2018 119 683.0

(51) Int. Cl.
| | | |
|---|---|---|
| *B01D 46/52* | (2006.01) | |
| *B01D 46/00* | (2022.01) | |
| *B01D 46/24* | (2006.01) | |
| *B29C 45/14* | (2006.01) | |
| *B29L 31/14* | (2006.01) | |

(52) U.S. Cl.
CPC ....... *B01D 46/521* (2013.01); *B01D 46/0001* (2013.01); *B01D 46/0005* (2013.01); *B01D 46/2403* (2013.01); *B01D 2275/201* (2013.01); *B01D 2275/206* (2013.01); *B01D 2279/60* (2013.01); *B29C 45/14336* (2013.01); *B29L 2031/14* (2013.01)

(58) Field of Classification Search
CPC .......................... B01D 46/521; B01D 46/0005
See application file for complete search history.

(56) References Cited

U.S. PATENT DOCUMENTS

| | | | | |
|---|---|---|---|---|
| 2,934,791 | A * | 5/1960 | Rohn | .................... B01D 29/21 210/493.1 |
| 4,517,090 | A | 5/1985 | Kersten et al. | |
| 5,954,847 | A | 9/1999 | Shively et al. | |
| 2011/0061353 | A1 | 3/2011 | Fischer | |
| 2013/0193063 | A1 | 8/2013 | Ng et al. | |
| 2014/0144111 | A1 | 5/2014 | Campbell et al. | |

FOREIGN PATENT DOCUMENTS

| | | |
|---|---|---|
| DE | 202009000969 U1 | 7/2010 |
| EP | 0145885 A1 | 6/1985 |
| EP | 0717177 A2 | 6/1996 |

* cited by examiner

*Primary Examiner* — Robert A Hopkins

(57) ABSTRACT

A round filter element has an annular circumferentially extending pleated filter medium body to be flowed through by a fluid to be purified radially relative to a longitudinal axis of the filter medium body. A first end disk is arranged at a first end face of the filter medium body. A second end disk is arranged at a second end face of the filter medium body. The second end face is axially opposite the first end face. An outer or an inner contour of the first end disk is identically or at least substantially identically embodied to an outer or an inner contour of the filter medium body. An outer or an inner contour of the second end disk is identically or at least substantially identically embodied to the outer or the inner contour of the filter medium body. One of the first and second end disks is open.

22 Claims, 3 Drawing Sheets

ROUND FILTER ELEMENT

CROSS-REFERENCE TO RELATED APPLICATIONS

This application is a continuation application of international application No. PCT/EP2019/070855 having an international filing date of 2 Aug. 2019 and designating the United States, the international application claiming a priority date of 14 Aug. 2018 based on prior filed German patent application No. 10 2018 119 683.0, the entire contents of the aforesaid international application and the aforesaid German patent application being incorporated herein by reference.

BACKGROUND OF THE INVENTION

The invention relates to a round filter element, in particular for gas filtration, for example, for an air filter, with an annular circumferentially extending pleated-type filter medium body which can be flowed through by a fluid to be purified in radial direction in relation to the longitudinal axis, comprising an end disk at an end face of the filter medium body.

DE 11 2013 005 697 T5 discloses a round filter element for an air filter, wherein the round filter element comprises an approximately hollow cylindrical filter medium body with filter pleats that is flowed through by the air to be purified in radial direction. For supporting the filter medium body, a support frame with longitudinal and circumferential webs is placed on the filter medium body wherein at the end face of the support frame a closed end disk is arranged which, in the mounted state, contacts an end face of the filter medium body. The closed end disk at the support frame comprises a star-shaped cross section shape that corresponds to the cross section shape of the filter medium body at its end face in such a way that the outer contour of the end disk coincides with the outer contour of the filter medium body at its end face. At the oppositely positioned end face that is of an open configuration, a sealing ring is provided at the support frame.

It is the object of the invention to configure a round filter element with an annular circumferentially extending pleated-type filter medium body with high efficiency with simple constructive measures.

SUMMARY OF THE INVENTION

This object is solved according to the invention in that an end disk is arranged, respectively, at axially oppositely positioned end faces of the filter medium body, wherein one end disk is of an open configuration, and in that the outer or the inner contour of the end disk is identically or at least substantially identically embodied to the outer or the inner contour of the pleated-type filter medium body.

The dependent claims provide expedient further developments.

The round filter element according to the invention is preferably used for gas filtration, for example, for an air filter for filtration of the combustion air which is supplied to an internal combustion engine. However, an application of the round filter element for liquid filtration is also conceivable.

The round filter element comprises an annular circumferentially extending filter medium body which is embodied as a hollow body and provided with filter pleats, wherein the flow of the fluid to be purified through the filter medium body—in relation to the longitudinal axis of the round filter element—is realized in radial direction. Advantageously, the filter medium body is flowed through by the fluid in radial direction from the exterior to the interior so that the outer side of the filter medium body forms the raw side and the inner side the clean side; the outflow of the purified fluid from the interior enclosed by the filter medium body is realized in axial direction. In the context of the invention, a flow through the filter medium body in radial direction from the interior to the exterior is also conceivable however.

For the annular circumferentially extending filter medium body, circular cross section shapes as well as cross section shapes that deviate from the circular shape are conceivable, for example, oval cross section shapes.

The filter pleats of the filter medium are advantageously oriented such that the pleat edges of the filter pleats extend in axial direction or are positioned in relation to the longitudinal axis at a preferably small angle of maximally 30°. Embodiments are thus also conceivable in which the filter medium body has a spiral-shaped or twisted configuration so that the filter edges of the pleated filter along the outer side of the filter medium body extend in a spiral shape. This is achieved, for example, in that the axially oppositely positioned end faces of the filter medium body are twisted relative to each other about the longitudinal axis of the filter medium body.

The filter medium body is provided at its two axially oppositely positioned end faces with an end disk, respectively. The end disks are in particular fixedly connected to the filter medium body. A first end disk is preferably of a closed configuration so that via this end disk no axial flow of the fluid is possible between the interior enclosed by the filter medium body and the surroundings outside of the filter medium body. The second oppositely positioned end disk is of an open configuration and enables an axial flow of the fluid that, for a radial flow through the filter medium body from the exterior to the interior, is axially discharged in axial direction through the open end disk.

As needed, both end disks can be of an open configuration wherein in this case the opening in one end disk is closed off by a housing-associated counter contour in the installed state.

The filter pleats extends across the entire axial length of the filter medium body so that the filter medium body in the region of both axial end faces comprises a pleated-type inner and outer contour. According to the invention, the outer or inner contour of the end disks is identical to or at least substantially the same as the outer or the inner contour of the pleated-type filter medium body in the respective end face section.

This configuration has the advantage that, due to the adaptation of the end disk contour to the end edge contour of the filter medium body, flow resistances of the fluid flowing through the round filter element can be reduced. Also, the use of end disk material can be reduced.

Advantageously, the open end disk follows the inner contour of the filter medium body so that the inner contour of the open end disk coincides completely or at least approximately with the inner contour of the filter medium body. The open end disk provides thus no flow resistance for the fluid when flowing through in axial direction.

According to a further advantageous embodiment, the closed end disk follows the outer contour of the filter medium body. This embodiment has the advantage that the outer contour of the closed end disk corresponds to the outer contour of the filter medium body and does not project past the outer contour of the filter medium body so that a space-saving arrangement is provided.

According to a further advantageous embodiment, the open end disk whose inner contour corresponds to the inner contour of the filter medium body comprises an annular circumferentially extending outer contour. This annular circumferentially extending outer contour comprises a deviating contour relative to the outer contour of the filter medium body. Accordingly, the open end disk is matched only at its inner contour to the filter medium body. The annular circumferentially extending outer contour at the open end disk makes it possible, for example, to arrange a circumferentially extending sealing ring at the open end disk which is positioned in particular at the axially externally positioned side face of the open end disk adjacent to the annular circumferentially extending outer contour. As needed, the sealing ring can also be arranged at the radially externally positioned outer side of the annular circumferentially extending outer contour.

According to yet a further advantageous embodiment, the filter medium body comprises a conical shape so that the axially oppositely positioned end faces of the filter medium body comprise a differently sized diameter. The cone angle—the angle deviation in relation to the longitudinal axis of the filter medium—lies in particular in an angle range of maximally 30°, for example, maximally 25°, maximally 20°, maximally 15°, maximally 10°, or maximally 5°. The cone-shaped embodiment of the filter medium body enables in particular an improved inflow. For example, upon flow through the filter medium in radial direction from the exterior to the interior the fluid to be purified is supplied axially to the outer side of the filter medium body wherein the cone shape promotes a radial deflection to the interior. Moreover, it is possible to use the round filter element with the cone-shaped filter medium body, for example, in gas-conducting lines without a separate filter housing. Also, additional installation spaces in receiving filter housings can be made available due to the cone shape.

Also, a hollow cylindrical filter medium body is conceivable as an alternative to a cone-shaped filter medium body.

Within a conduit, for example, an air-guiding one, the filter element can optionally be used as an HO trap for binding entrained hydrocarbons.

The invention relates furthermore to a filter device with an afore described round filter element wherein the filter device comprises a filter housing for receiving the round filter element.

The invention relates also to a method for producing an afore described round filter element, the method including providing a filter medium; forming a plurality of pleats into the filter medium; forming the pleated filter medium into an annular pleated filter medium body, the annular pleated filter medium body is circumferentially closed and forms a hollow body having a hollow interior, such that the annular pleated filter medium body surrounds a longitudinal axis extending through a hollow interior of the annular pleated filter medium body from a first axial end face to an opposite second axial end face of the annular pleated filter medium body. Individual pleats of the plurality of pleats of the annular pleated filter medium body extend axially from the first axial end face to the opposite second axial end face of the annular pleated filter medium body.

As a note-axial, as used herein, is a direction of the longitudinal axis. radial, as used herein, is a direction transverse to the longitudinal axis.

The method preferably further includes axially compressing the filter medium of the annular pleated filter medium body, to form a compressed section arranged adjacent to but spaced axially inwardly away from a respective one of the axial end faces by a distance of maximally 5 mm, forming an uncompressed free region of the filter medium between the compressed section and the respective axial end face. Forming and fixing a first end disk onto an axial end face of the annular pleated filter, wherein the forming and fixing of the first end disk is carried out by: providing a flowable plastic material; applying the flowable plastic material in a flowable state onto the uncompressed free region of the annular filter medium body such that the compressed section forms a barrier separating the flowable plastic material from an axially inward uncompressed region of the annular pleated filter medium body; and curing or hardening the flowable plastic material on the axial end face of the annular pleated filter medium body, forming the first end disk.

The method may further include forming and fixing a second end disk onto an opposite axial end face of the annular pleated filter, the second end disk, may be formed as described for the first end disk.

Preferably the outer contour or an inner contour of the first end disk is identically or at least substantially identically embodied to an outer contour or an inner contour of the annular pleated filter medium body. Preferably the outer contour or inner contour of the second end disk is identically or at least substantially identically embodied to the outer contour or the inner contour of the annular pleated filter medium body.

The method preferably may further include forming the pleated filter medium body such that the first axial end face has a smaller outer diameter than the opposite second axial end face such that the annular pleated filter medium body has an outer diameter that changes conically from the first axial end face to the opposite second axial end face at a cone angle of maximally 30 degrees.

In the applying the flowable plastic material, the flowable plastic material may be applied by either: immersing the uncompressed free region of the annular filter medium body into the flowable plastic material, or injection molding the flowable plastic material onto the uncompressed free region of the annular filter medium body.

Preferably, one of the first and second end disks is an open end disk and a different one of the first and second end disks is a closed end disk.

In the forming an end disk, preferably an outer contour of the closed end disk follows an adjacent outer contour of the annular filter medium body. Preferably an inner contour of the open end disk follows an adjacent inner contour of the filter medium body.

In the method, axially compressing the filter medium is preferably includes: providing a lower casting mold part and an upper casting mold part; and placing the annular pleated filter medium body onto the lower casting mold part. Preferably the axially compressing the filter medium is practiced by: moving the upper casting mold part from above onto the annular pleated filter medium body and moving the upper casting mold part towards the lower casting mold part, wherein one of the casting mold parts is positioned inside the annular filter medium body and a different one of the casting mold parts is positioned outside of the filter medium body. The practice further includes interacting the upper casting mold part with the lower casting mold part such that the compressed section is formed in the annular filter medium body adjacent to but spaced axially inwardly away from a respective one of the axial end faces by a distance of maximally 5 mm.

The invention relates also to a method for producing an afore described round filter element by means of the two or more casting mold parts that are inserted from axially opposite directions in and about the annular circumferentially extending pleated-type filter medium body or placed on the latter. The two casting parts are located at the inner side and the outer side of the filter medium body and interact in this context in such a way with each other that the material of the filter medium body is compressed adjacent to an end face but at a distance to this end face. After introducing the casting mold parts and compression of the material of the filter medium body, an end disk is subsequently formed in that the end disk material in a flowable state is applied to that end face whose material is compressed by the two interacting casting mold parts. The end disk material can be injection molded around or the end edge of the filter medium body is immersed in a mold with liquid or at least flowable end disk material.

This procedure has the advantage that only a single process step is required in order to fasten the end disk at the filter medium body. By compression of the end face filter medium body material, it is prevented that the end disk material in the liquid or at least flowable state spreads into the compressed section of the filter medium body. It is thus ensured that the end disk material penetrates only in a defined region into the material of the filter medium body and produces a fixed connection with the filter medium body.

The end disk material is in particular a plastic material. The filter medium body is comprised, for example, of nonwoven material.

The method for producing the round filter element is suitable in particular for cone-shaped filter medium bodies in which an axial interaction of the casting mold parts with axial approach inside or outside of the filter medium body can be easily realized.

Alternatively, the method for producing a round filter element can be used also for hollow cylindrical filter media bodies.

The compression of the filter medium body material by means of the two casting mold parts is realized adjacent to the end face, but at the same time at a minimal distance to the end face, in order to enable immersion of the end face into the liquid or flowable end disk material during manufacture and to permit spreading of the end disk material into the uncompressed region. The free region that is neighboring the end face and is not compressed has an axial extension of, for example, maximally 5 mm or maximally 3 mm.

The end disk material can be introduced in liquid or at least flowable form into a hollow space which is provided in a casting mold part. During manufacture, first the filter medium body is placed onto a casting mold part positioned at the bottom, subsequently the second casting mold part is positioned axially on the filter medium body as well as the lower casting mold part, whereupon the desired compression of the filter medium body material adjacent, but at a distance, to the bottom end face of the filter medium body is realized. Subsequently, the liquid or flowable end disk material can be introduced into the cutout in the lower casting mold part so that the end disk material comes into contact with the uncompressed part of the filter medium body at the end face and can cure.

Advantageously, end disks are cast or injection molded on the filter medium body at both oppositely positioned end faces, wherein at a minimal distance to the respective end face the filter medium body material is compressed by means of the two interacting casting mold parts.

BRIEF DESCRIPTION OF THE DRAWINGS

Further advantages and expedient embodiments can be taken from the additional claims, the figure description and the drawings.

In the Figures, same components are provided with same reference characters.

DESCRIPTION OF PREFERRED EMBODIMENTS

Figure 1:
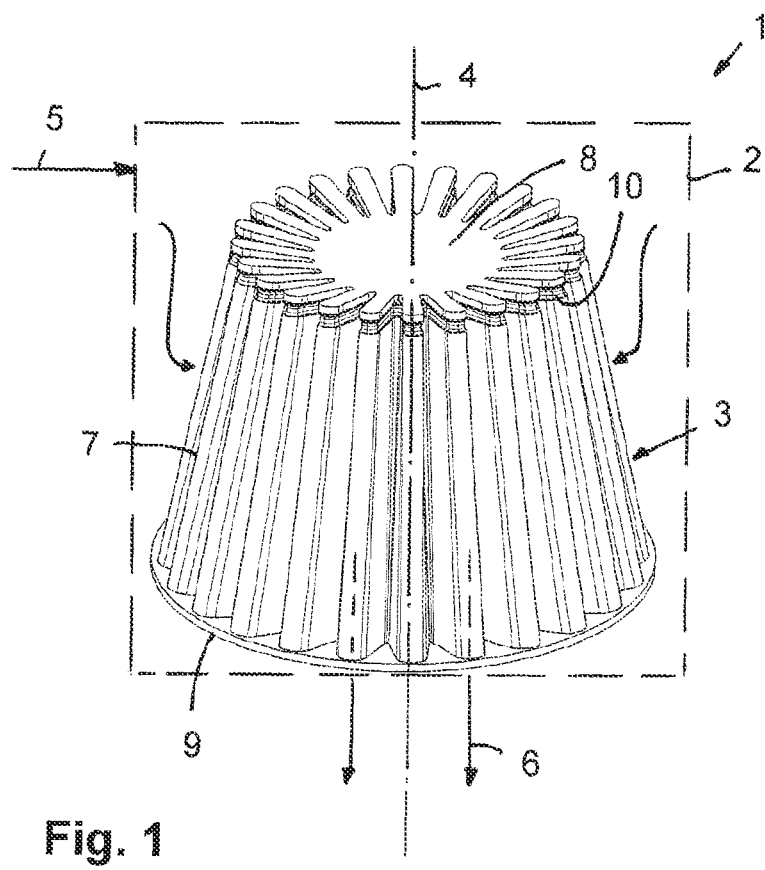
FIG. 1 shows a perspective view of a filter device with a round filter element that comprises a conical pleated-type filter medium body with end disks applied to the end faces.
Figure 2:
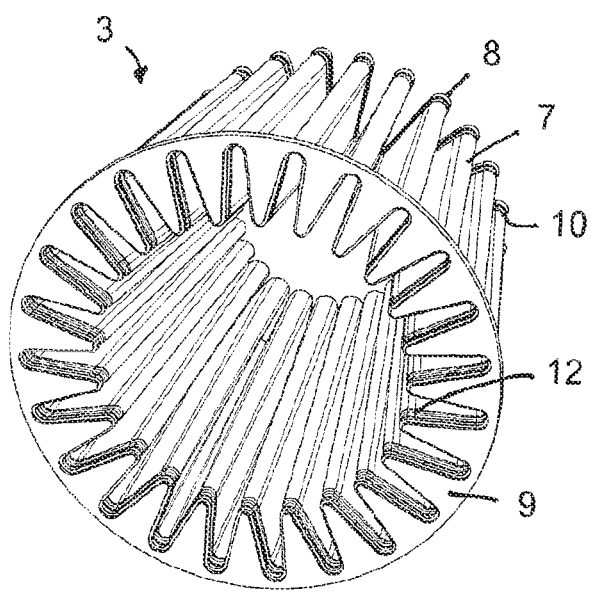
FIG. 2 shows a perspective view of the open end face of the round filter element.
Figure 3:
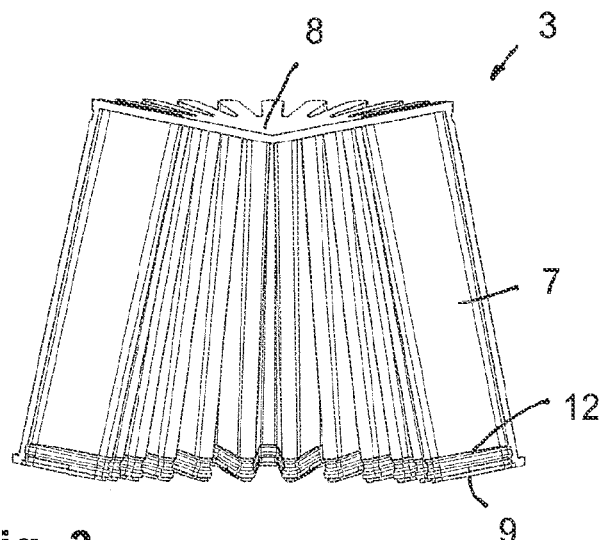
FIG. 3 shows the round filter element in half section view.

In FIG. 1, a filter device 1 is illustrated that can be used for gas filtration, for example, for an air filter for filtration of the combustion air of an internal combustion engine. The filter device 1 comprises a filter housing 2 and a round filter element 3 arranged in the filter housing 2 that, in relation to its longitudinal axis 4, is flowed through by the fluid to be purified in radial direction from the exterior to the interior. The fluid is introduced in the unpurified state via the fluid inlet 5 into the filter housing 2 and discharged in the purified state from the filter housing 2 through a fluid outlet 6. The outer side of the round filter element 3 forms the raw side, the inner side of the round filter element 3 forms the clean side that surrounds a preferably cylindrical interior inside the round filter element 3. From the interior in the round filter element 3, the purified fluid can be discharged axially through the fluid outlet 6 from the round filter element 3 and the filter device 1.

As can be seen in FIG. 1 in connection with the additional Figures, the round filter element 3 comprises a filter medium body 7 and end disk 8 and 9 at the oppositely positioned end faces of the filter medium body 7. The filter medium body 7 is embodied as an annular circumferentially extending body in cone shape and comprises a plurality of filter pleats whose filter edges extend at the cone angle of the cone shape in relation to the longitudinal axis 4 of the filter medium body 7. The cone angle amounts to 15° to 20° in the embodiment. The filter pleats of the filter medium body 7 are formed across the axial length of the filter medium body in a steady shape so that the pleat height—viewed in the radial direction—along the axial height of the filter medium body 7 remains the same. The filter pleats increase in a significant manner the filter surface of the filter medium body 7. The filter medium body 7 is comprised, for example, of a nonwoven material.

The end disk 8 at the narrower end face of the filter medium body 7 is of a closed configuration while the end disk 9 at the wider end face of the filter medium body 7 is of an open configuration. The end disks 8 and 9 are comprised of a plastic material that, for manufacturing, is introduced in liquid or at least flowable state into a casting mold part into which the respective end face region of the filter medium body 7 is immersed. In this context, two casting mold parts interact of which the lower casting mold part is provided with a cutout for receiving the end disk material. During manufacture, first the filter medium body is placed onto the lower casting mold part without end disk material, subsequently a second casting mold part is placed from above onto the filter medium body and the lower casting mold part, wherein one casting mold part is positioned inside the filter medium body and the second casting mold part outside of the filter medium body. The casting mold parts interact such with each other in such a way that the material of the filter medium body adjacent to the end face, but with a minimal spacing to the end face, is compressed.

After introducing the liquid or at least flowable end disk material into the correlated cutout in the lower casting mold part, the uncompressed section of the filter medium body 7 adjoining immediately the end face is immersed in the end disk material that can penetrate into the filter medium body material so that, after curing of the end disk material, a fixed connection between the end disk and the filter medium body is provided. At the same time, the compressed material of the filter medium body prevents undesirable spreading of end disk material into the filter medium body. This procedure can be carried out at both end faces of the filter medium body in order to respectively attach an end disk to the filter medium body.

The closed end disk 8 at the narrower side of the cone-shaped filter medium body 7 corresponds to the outer contour of the filter medium body 7 at the narrow end face. Thus, no end disk material of the end disk 8 projects past the outer contour of the filter medium body 7 at its raw side. The compressed section 10 of the filter medium body 7 adjoins immediately the closed end disk 8. The compressed section 10 extends axially past a length which is only slightly larger than the axial thickness of the end disk 8.

The oppositely positioned end face of the filter medium body 7 is covered by the open end disk 9 which comprises a large central cutout through which the purified fluid can axially flow out of the interior of the filter medium body 7. Accordingly, the open end disk 9 is of an annular shape. The outer contour of the open ring-shaped end disk 9 forms a circular ring and projects slightly past the outer contour of the filter medium body 7 at its wider end face. The inner contour of the open end disk 9 is matched to the inner contour of the filter medium body 7 at its wider end face. In this way, it is achieved, on the one hand, that the end faces of the filter pleats of the filter medium body 7 are covered flow-tightly by the end disk at the open end face. On the other hand, a maximum free flow area at the open end face of the filter medium body 7 is provided so that the purified fluid can flow axially out of the interior of the filter medium body 7 without any obstacles.

The open end disk 9 is located at the wider end face of the filter medium body 7 and frames the filter medium body 7 in the end face section. A compressed section 12 adjoins here axially which ensures that in the manufacturing process of the round filter element 3 no liquid or flowable end disk material can spread into the compressed section 12 of the filter medium body 7.

Figure 4:
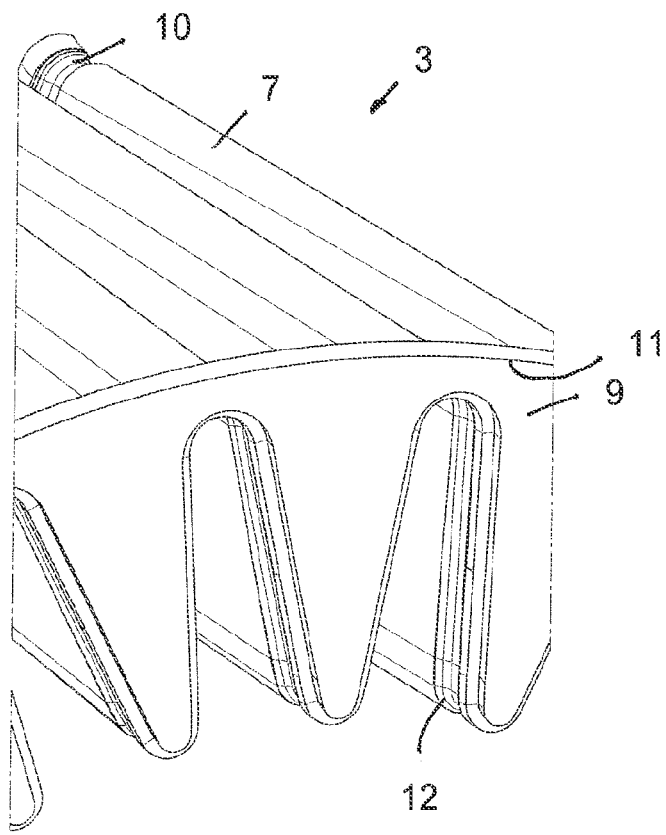
FIG. 4 shows an enlarged detail view of the open end disk at the filter medium body.
Figure 5:
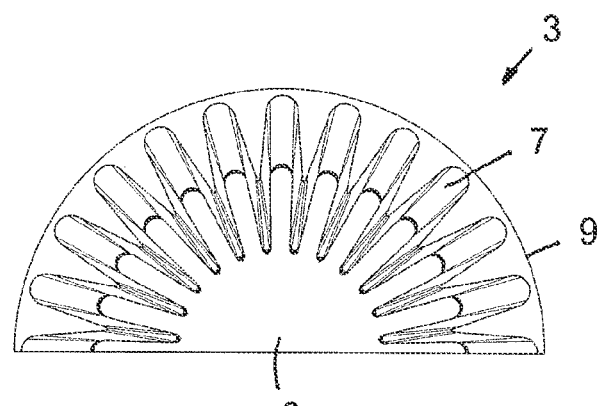
FIG. 5 shows the round filter element in plan view with closed end disk.
Figure 6:
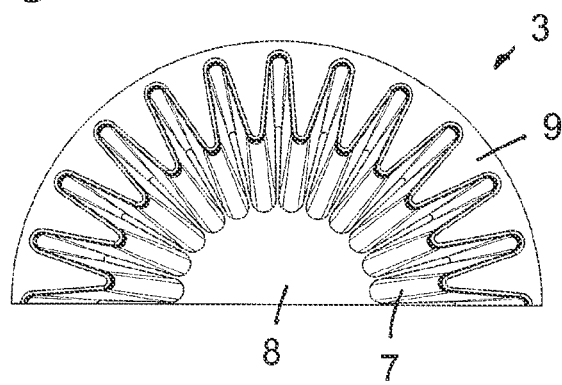
FIG. 6 shows the round filter element in a view from below with the open end disk.

At the outwardly positioned side face of the open end disk 9, a circumferentially extending sealing ring is arranged; the sealing ring position 11 is illustrated in FIG. 4. The sealing ring at the sealing ring position 11 ensures flow-tight separation of the clean side from the raw side of the filter element 3. In the installed state, the round filter element 3 is supported with the sealing ring loaded in axial direction at the sealing ring position 11 at a housing-associated component of the filter housing.

What is claimed is:
1. A method for producing a round filter element, the method comprising the steps of:
   providing a filter medium;
   forming a plurality of pleats into the filter medium;
   forming the pleated filter medium into an annular pleated filter medium body, the annular pleated filter medium body is circumferentially closed and forms a hollow body having a hollow interior;
   wherein the annular pleated filter medium body surrounds a longitudinal axis extending through a hollow interior of the annular pleated filter medium body from a first axial end face to an opposite second axial end face of the annular pleated filter medium body,
   wherein axial, as used herein, is a direction of the longitudinal axis,
   wherein radial, as used herein, is a direction transverse to the longitudinal axis;
   wherein individual pleats of the plurality of pleats of the annular pleated filter medium body extend axially from the first axial end face to the opposite second axial end face of the annular pleated filter medium body;
the method further comprising:
   axially compressing the filter medium of the annular pleated filter medium body, to form a compressed section arranged adjacent to but spaced axially inwardly away from a respective one of the axial end faces by a distance of maximally 5 mm, forming an uncompressed free region of the filter medium between the compressed section and the respective axial end face;
   forming and fixing a first end disk onto an axial end face of the annular pleated filter, wherein the forming and fixing of the first end disk is carried out by:
   providing a flowable plastic material;
   applying the flowable plastic material in a flowable state onto the uncompressed free region of the annular filter medium body such that the compressed section forms a barrier separating the flowable plastic material from an axially inward uncompressed region of the annular pleated filter medium body;
   curing or hardening the flowable plastic material on the axial end face of the annular pleated filter medium body, forming the first end disk;
   forming and fixing a second end disk onto an opposite axial end face of the annular pleated filter;
   wherein an outer contour or an inner contour of the first end disk is identically or at least substantially identically embodied to an outer contour or an inner contour of the annular pleated filter medium body;
   wherein an outer contour or an inner contour of the second end disk is identically or at least substantially identically embodied to the outer contour or the inner contour of the annular pleated filter medium body.

2. The method according to claim 1, wherein
in the step of forming the pleating filter medium into an annular pleated filter medium body, the first axial end face has a smaller outer diameter than the opposite second axial end face such that the annular pleated filter medium body has an outer diameter that changes conically from the first axial end face to the opposite second axial end face at a cone angle of maximally 30 degrees.

3. The method according to claim 1, wherein
in the step of applying the flowable plastic material, the flowable plastic material is applied by either:
   immersing the uncompressed free region of the annular filter medium body into the flowable plastic material, or injection molding the flowable plastic material onto the uncompressed free region of the annular filter medium body.

4. The method according to claim 3, wherein
in the step of forming the pleating filter medium into an annular pleated filter medium body, the first axial end face has a smaller outer diameter than the opposite second axial end face such that the annular pleated filter medium body has an outer diameter that changes conically from the first axial end face to the opposite second axial end face at a cone angle of maximally 30 degrees.

5. The method according to claim 1, wherein
one of the first and second end disks is an open end disk;
a different one of the first and second end disks is a closed end disk.

6. The method according to claim 5, wherein
in the step of forming an end disk,
an outer contour of the closed end disk follows an adjacent outer contour of the annular filter medium body.

7. The method according to claim 5, wherein
in the step of forming an end disk,
an inner contour of the open end disk follows an adjacent inner contour of the filter medium body.

8. The method according to claim 2, wherein
before the step of axially compressing the filter medium, the method further comprises:
providing a lower casting mold part and an upper casting mold part;
placing the annular pleated filter medium body onto the lower casting mold part;
wherein the step of axially compressing the filter medium is practiced by:
moving the upper casting mold part from above onto the annular pleated filter medium body and moving the upper casting mold part towards the lower casting mold part;
wherein one of the casting mold parts is positioned inside the annular filter medium body and a different one of the casting mold parts is positioned outside of the filter medium body;
interacting the upper casting mold part with the lower casting mold part such that the compressed section is formed in the annular filter medium body adjacent to but spaced axially inwardly away from a respective one of the axial end faces by a distance of maximally 5 mm.

9. The method according to claim 1, wherein
the step of forming and fixing a second end disk is practiced by:
providing a flowable plastic material;
applying the flowable plastic material in a flowable state onto the uncompressed free region of the annular filter medium body such that the compressed section forms a barrier separating the flowable plastic material from an axially inward uncompressed region of the annular pleated filter medium body;
curing or hardening the flowable plastic material on the axial end face of the annular pleated filter medium body, forming the second end disk.

10. The method according to claim 1, wherein
the step of axially compressing the filter medium further includes:
axially compressing the filter medium of the annular pleated filter medium body to form a second compressed section arranged adjacent to but spaced axially inwardly away from an opposite axial end face by a distance of maximally 5 mm, forming a second uncompressed free region of the filter medium between the second compressed section and the opposite axial end face;
wherein the step of forming a second end disk is practiced by:
applying the flowable plastic material in a flowable state onto the second uncompressed free region of the annular filter medium body such that the second compressed section forms a barrier separating the flowable plastic material from an axially inward uncompressed region of the annular pleated filter medium body;
curing or hardening the flowable plastic material on the opposite axial end face of the annular pleated filter medium body, forming the second end disk.

11. A round filter element according to claim 1, wherein
the annular pleated filter medium body is configured to be flowed through by a fluid to be purified in a radial direction in relation to the longitudinal axis of the annular pleated filter medium body;
wherein an outer contour or an inner contour of the first end disk is identically or at least substantially identically embodied to an outer contour or an inner contour of the annular pleated filter medium body;
wherein an outer contour or an inner contour of the second end disk is identically or at least substantially identically embodied to the outer contour or the inner contour of the annular pleated filter medium body;
wherein one of the first and second end disks is open.

12. The round filter element according to claim 11, wherein the first end disk is closed and the second end disk is open.

13. The round filter element according to claim 12, wherein the outer contour of the first end disk that is closed follows the outer contour of the annular pleated filter medium body.

14. The round filter element according to claim 12, wherein the inner contour of the second end disk that is open follows the inner contour of the annular pleated filter medium body.

15. The round filter element according to claim 11, wherein the inner contour of said one of the first and second end disks that is open follows the inner contour of the annular pleated filter medium body.

16. The round filter element according to claim 15, wherein said one of the first and second end disks that is open comprises an annular circumferentially extending outer contour at a radial outer side of the filter medium body.

17. The round filter element according to claim 11, wherein the first end disk is a component that is injection molded to the first axial end face and wherein the second end disk is a component that is injection molded to the second axial end face.

18. The round filter element according to claim 11, wherein filter medium body has a cone shape.

19. The round filter element according to claim 18, wherein the cone shape has a first end with a first diameter and a second end with a second diameter, wherein the first diameter is larger than the second diameter, wherein said one of the first and second end disks that is open is arranged at the first end of the cone shape.

20. The round filter element according to claim 11, wherein said one of the first and second end disks that is open comprises an outwardly positioned side face, wherein a circumferentially extending sealing ring is arranged at the outwardly positioned side face.

21. A filter device comprising:
a round filter element according to claim 11; and
a filter housing configured to accommodate the round filter element,
wherein the filter device is an air filter.

22. A method for producing a round filter element, the method comprising the steps of:
providing a filter medium;
forming a plurality of pleats in the filter medium to create a pleated filter medium;
forming the pleated filter medium into an annular pleated filter medium body, the annular pleated filter medium body being circumferentially closed and forming a hollow body having a hollow interior;
  wherein the annular pleated filter medium body surrounds a longitudinal axis extending through a hollow interior of the annular pleated filter medium body from a first axial end face to an opposite second axial end face of the annular pleated filter medium body,
  wherein individual pleats of the plurality of pleats of the annular pleated filter medium body extend axially from the first axial end face to the opposite second axial end face of the annular pleated filter medium body;
the method further comprising:
  axially compressing the filter medium of the annular pleated filter medium body, to form a compressed section arranged adjacent to but spaced axially inwardly away from a respective one of the axial end faces, forming an uncompressed free region of the filter medium between the compressed section and the respective axial end face;
forming and fixing a first end disk onto an axial end face of the annular pleated filter, wherein the forming and fixing of the first end disk is carried out by:
providing a flowable plastic material;
applying the flowable plastic material in a flowable state onto the uncompressed free region of the annular filter medium body such that the compressed section forms a barrier separating the flowable plastic material from an axially inward uncompressed region of the annular pleated filter medium body;
curing or hardening the flowable plastic material on the axial end face of the annular pleated filter medium body, forming the first end disk;
forming and fixing a second end disk onto an opposite axial end face of the annular pleated filter;
wherein an outer contour or an inner contour of the first end disk is complementary to an outer contour or an inner contour of the annular pleated filter medium body;
wherein an outer contour or an inner contour of the second end disk is complementary to the outer contour or the inner contour of the annular pleated filter medium body.

* * * * *